3,245,818
VAPOR PHASE OXIDATION

Arthur Wallace Evans, Middlesbrough, Kenneth Arkless, Stockton-on-Tees, and John Peacock, Middlesbrough, England, assignors to British Titan Products Company Limited, Billingham, England, a company of the United Kingdom
No Drawing. Filed Sept. 13, 1962, Ser. No. 223,555
Claims priority, application Great Britain, Sept. 27, 1961, 34,760/61
7 Claims. (Cl. 106—300)

The present invention relates to a method for the production of pigmentary titanium dioxide.

It is known to produce titanium dioxide by the oxidation of a titanium tetrahalide, for example titanium tetrachloride, in a hot fluidized bed of particulate material. Such a process is described, for example, in British patent specification No. 761,770. It has also been suggested that aluminum chloride can be mixed with titanium tetrachloride before introduction of the latter into the fluidized bed, in order to modify the titanium dioxide produced when the tetrachloride is oxidized.

These fluidized bed processes for the production of titanium dioxide suffer from the grave disadvantage that a substantial part (of the order of 20% to 40%) of the product is retained on the surface of the bed particles in the form of an exceedingly hard and firmly adhering coating. This coating is so hard that, even if it is submitted to prolonged grinding, it can be broken down only to a very small extent, and the small amount of titanium dioxide which is separable from the bed particles after such grinding is unsuitable for use as a pigment since its particle size is too large, thus causing grittiness and poor tinting strength. It may find limited use in vitreous enamels or, if desired, it may be chlorinated to titanium tetrachloride. It is, however, not in general of significant commercial value.

This retention of a substantial proportion of the titanium dioxide on the bed particles, with consequent waste, has limited the commercial exploitation of the fluidized bed oxidation process for the production of titanium dioxide.

There is herein provided a method for overcoming the above described disadvantages of the fluidized bed process and for recovering substantially all of the titanium dioxide product of the reaction having a very high pigmentary rutile content. The present invention does not prevent the formation of the accretion described above, but rather ensures that the accretions are made up of particles which are loosely held together and which can be removed from the bed particle substrate and separated as generally pigmentary rutile by a simple process of attrition. On the other hand, the inert particles coated with the loosely held pigmentary titanium dioxide may be employed as such in the manufacture of paints.

It is an object of the present invention to provide a fluidized bed process in which at least a substantial quantity, and generally the greater proportion, of the titanium dioxide retained on the bed particles can be recovered in the form of pigment. It is a further object of the invention to recover such titanium dioxide as pigment almost completely in the rutile form.

Accordingly, the present invention is a process for the production of titanium dioxide comprising introducing into a hot fluidized bed of particulate material containing silicon and oxygen in chemical combination, a titanium tetrahalide, an aluminum halide and an oxygenating gas, the aluminum halide being introduced into the bed separately from the titanium tetrahalide; recovering titanium dioxide from the gases leaving the bed; and subjecting the bed material associated with retained titanium dioxide to abrasion to recover titanium dioxide in pigmentary form.

It is preferable that at least 25% by weight of the bed particles are particles in which silicon and oxygen are in chemical combination. These latter particles may also contain other elements in combination, for example zirconium. Silicates, particularly zircon sand ($ZrO_2.SiO_2$) and sillimanite ($Al_2O_3.SiO_2$), have been found effective, as have silica sands of suitable particle size, consisting substantially of pour silicon dioxide. However, sillimanite may suffer from the disadvantage that it is soft and may break up when the particles and retained titanium dioxide are being ground. Thus, when using sillimanite, it is advisable to utilize precautionary measures to recover titanium dioxide from its surface to preclude its breaking up on grinding and thus being mixed with the pigmentary titanium dioxide being recovered.

The bed particles should of course be of suitable size to allow fluidization at the flow rates of the gases it is desired to use. Particles sizes in the range of 40 to 1,000 microns, preferably 100 to 500 microns, have been found particularly convenient.

If there are present bed particles other than those containing silicon and oxygen in chemical combination, they may be any of the bed particles suitable for use in the fluidized bed oxidation of titanium tetrahalide. Examples of such particles are those of alumina, zirconia, and titanium dioxide.

The process is normally carried out with a fluidized bed maintained at a temperature in the range between 900° C. and 1200° C., preferably between 1,000° C. and 1100° C., since at these temperatures (and especially in the latter range) the pigmentary qualities of the titanium dioxide entrained in the gases leaving the bed are particularly good.

When the process is operated on a small scale where heat losses are high it may be necessary to supply the bed with heat from a source external to the reaction if these bed temperatures are to be maintained; an example of such source is the burning of a fuel in the reaction chamber. In general, however, when operating on a large scale it is possible to carry out this reaction as an autothermal process; that is, the heat generated by the oxidation of the titanium tetrahalide is sufficient to maintain the bed temperature within the desired range without the application of external heat.

Usable aluminum halides include aluminum chloride, aluminum bromide, and aluminum iodide. Usable titanium tetrahalides are titanium tetrachloride, titanium tetrabromide and titanium tetraiodide.

The preferred titanium tetrahalide to be used in the present invention is titanium tetrachloride, and the preferred aluminum halide is aluminum trichloride. The terms "halide" and "tetrahalide" as used in this specification do not include the fluoride or tetrafluoride.

The aluminum halide may be introduced into the fluidized bed from any point and in any manner so long as it is introduced separately from the titanium tetrahalide since it has been found that addition with titanium tetrahalide does not give a soft pigmentary accretion on the bed particles. The aluminum halide is conveniently introduced into the fluidized bed in the stream of oxygenating gas supplied to the process. It is also advantageous to introduce the aluminum halide into the base of the bed, for example through the base of the reactor.

The amount of aluminum halide, for example aluminum trichloride, introduced into the bed should normally be such as to produce at least 0.1%, and suitably not more than 10%, alumina by weight of the titanium dioxide produced. The preferred amount of alumina produced is in the range 1% to 6%, especially 2% to 4%, by weight of the titanium dioxide produced, since these quantities have been found to give maximum softness of the bed and maximum rutile content of the titanium dioxide produced.

The oxygen and aluminum halide may suitably be supplied at a temperature of 100 to 600° C., preferably 150 to 300° C., and the titanium tetrahalide at a temperature of 150 to 800° C., preferably 150 to 300° C.

If desired, the oxidation of the titanium tetrahalide may be carried out in the presence of moisture in addition to the presence of aluminum halide (or alumina obtained therefrom), since the presence of moisture also encourages the formation of rutile titanium dioxide. It is desirable, if moisture be introduced, that it be fed separately from the titanium tetrahalide and also separately from any aluminum halide. The moisture may be introduced with the oxygen containing gas although, if both aluminum halide and moisture are introduced, it would be preferable to introduce the moisture as a separate stream and to introduce aluminum halide with the oxygen-containing gas.

In the course of the reaction, the greater part of the titanium dioxide produced (for example 60% to 80%) will normally be entrained as pigmentary material in the gases leaving the bed and this material will be almost entirely (from about 90% to 99%) in the rutile form. This material can be recovered from the gas stream by any known method, for example by cooling and filtration through cloth filters. The halogen in the gas stream, for example chlorine, may then be recovered, liquefied and reused in the production of further quantities of titanium tetrahalide.

The remaining part of the titanium dioxide produced will be retained in the bed as a loosely bound soft accretion on the bed particles. This material will generally be of the rutile form also.

Owing to this retention the bed particles increase in size and the bed in volume. The excess material may be recovered from the bed at intervals or continuously (e.g. bed overflow) and the material so recovered may be replaced by smaller particles of suitable material. The excess material removed from the bed is then subjected to abrasion to remove and separate the loosely bound accretion from the bed particles. The bed particles will be, in general, much coarser than the titanium dioxide particles and sieving or either air or liquid classification, for example, will permit the bed particles to be separated, recovered and, if desired, returned to the fluidized bed. The pigmentary rutile titanium dioxide removed from the particles is then recovered and if desired treated by coating or by other processes before sale.

Among the methods of abrasion which may be used for the removal of the loosely bound accretion on the bed particles are many forms of milling conducted by wet or dry processes. Suitable methods are disclosed in British specification No. 26,192/60, now British Patent 986,660. It is preferred to use wet processes as in this case the pigmentary material recovered by abrasion may be passed immediately to hydro-separation plant and then exposed to a wet coating process, before being dried and dressed for use as pigment. It may be advantageous to use mills wherein the agitator is made, at least on the surface, of polyurethane rubber and revolves in a vessel which may itself be lined with polyurethane rubber; such a system is described in our British Patent 986,660.

The wet milling process may be that using the usual ball mills, preferably those made of stone or ceramic ware which will not be unduly abraded and will not, therefore, introduce a discoloring impurity into the final product. The actual milling medium may vary in size between wide limits, for example spheres of 3″ diameter or fine sand of particles of diameter from about 100µ to 1,000µ may be used. The construction of the mills may vary considerably, for example they may employ a simple revolving cylinder, or a method whereby sand is mechanically impelled by agitators. Many variants of these methods will be obvious to one skilled in the art.

It is, for example, possible to employ a method of milling wherein the milling medium is similar to the material forming the original fluidized bed, or wherein the particulate substrate material removed from the fluidized bed is itself used as a milling medium. Dry mills may also be used although they are not preferred; they may be of similar construction to the wet mills except that no liquid is present. Other suitable mills are those of the fluid energy type, sometimes referred to as jet mills.

In general, it is preferred that the bed particles be subjected to abrasion by a wet sand milling process, that is a process wherein the particles are agitated by impellers with fine sand of particle diameter of about 250µ to 1,000µ in the presence of a liquid such as water. The milling sand is so chosen that it can be readily separated from the ground pigment either by sieving (the sand of course having a greater particle size than the pigment) or by preferential settling, for example as described in our co-pending application No. 28,311/61, now British Patent 971,756 (wherein the settling rate depends both on the density and on the particle size).

In the fluidized bed, some of the silicon may become associated, in the form of silica, with the titanium dioxide produced. The amount of such silica may be 0.05% to 2%, by weight of the titanium dioxide.

By the term "pigmentary material" as used in this specification is meant titanium dioxide particles in the size range of 0.1µ to 0.4µ and preferably in the range 0.15µ to 0.3µ, which have a tinting strength, for example on the Reynolds scale, of at least 700 and preferably of at least 900.

By the term "oxygenating gas," we mean any gas which will oxygenate the titanium tetrahalide to titanium dioxide. The obvious example of course is oxygen, either by itself or in the form of air.

The following examples show embodiments of the present invention.

Example 1

An apparatus was set up for the fluidized bed oxidation of titanium tetrachloride with oxygen consisting of a silica tube 3 inches in diameter having a plate across the bottom through which two U-shaped injectors pass. The orifices of the inpectors were positioned about 2 inches above the plate.

880 grams of sillimanite particles of −44 +72 B.S.S. size were placed in the tube above the plate, forming a bed 6 inches in depth.

The tube was placed in an electric furnace in an upright position and the injectors were connected to a source of titanium tetrachloride vapor and to a source of oxygen. Provision was also made for the injection of aluminum trichloride vapor into the oxygen stream below the plate.

The electric furnace was switched on and the bed allowed to reach a temperature of 1,050° C. during which time it was fluidized with nitrogen. Titanium tetrachloride vapor was then passed through the bed at a rate of 55 mls. of liquid (measured at room temperature) per minute. Sufficient aluminum trichloride vapor was metered into the oxygen stream to produce 3% alumina, by weight of the theoretical amount of titanium dioxide produced during the process. After the process had been operated for 30 minutes the bed material was removed and examined for the amount of titanium dioxide retained on it. The bed material was then subjected to sand milling by agitating as an aqueous slurry with silica sand of −18 +25 B.S.S. size for a period of 60 minutes. The milled off pigment was then separated from the bed material, and the latter was examined for the amount of titanium dioxide still retained thereon. The pigment was dried and examined for tinting strength and rutile content.

Example 2

The process described in Example 1 was repeated using 1816 grams of zircon sand of −60 +150 B.S.S. size as the bed material.

Example 3

The process described in Example 1 was repeated using 695 grams of crushed silica of −44 +72 B.S.S. size as the bed material.

Example 4

As a contrast to the examples according to the invention, the process described in Example 1 was repeated using 1550 grams of titanium dioxide of −44 +72 B.S.S. size as the bed material.

The results shown in the following table were obtained. It was apparent that, in the case of Examples 1 and 3, further pigmentary titanium dioxide could have been removed from the bed particles had the milling continued for a further period.

| Material produced as described in Example | Before milling | | After milling | |
|---|---|---|---|---|
| | Percent Retained on the bed particles | Rutile content (of the pigment entrained from the bed) | Percent Retained on the bed particles | Rutile content (of pigment milled off the bed) |
| 1 | 39.0 | 99% | ---------- | 95.9% |
| 2 | 32.4 | 98.7% | Nil | 97.7% |
| 3 | 32.9 | 98.0% | 9.2 | 94.0% |
| 4 | 34.6 | 98.6% | Not millable | |

In Example 1, very little titanium dioxide was left retained on the bed particles after milling, but it was not possible to measure the precise quantity since the sillimanite was very soft and tended to break up on milling.

The material milled from the particles was of good pigmentary quality having a tinting strength on the Reynolds scale greater than 1150.

In all cases, the tinting strength of the pigment entrained from the bed was 1650–1750 on the Reynolds scale.

The size of the inert particles comprising the bed material suitably range from 40 to 1000 microns in size. The bed material may comprise silica, zircon, alumina and/or titanium dioxide (particularly rutile), as long as there is a proportion of particles containing silicon and oxygen in chemical association.

When these inert bed particles are coated with loosely held or lightly cemented titanium dioxide as described hereinabove, a pellet is formed which has a size of about 200 to 2000 microns. The lightly cemented titanium dioxide held on the surface has a particle size ranging from 0.05 to 0.6 microns, preferably from 0.15 to 0.3 micron.

These pellets may be employed directly in paint as a pigment. Thus, they may be milled with a commercial alkyd resin, such as a linseed oil modified pentaerythritol-phthalic acid polyester, in a porcelain lined pebble mill containing porcelain balls. Usually less than the conventional number of balls are necessary due to the increased volume resulting from the addition of the pellets. The paint solvent (for example, mineral spirits) may be first milled with the pigment so as to separate the pigmentary $TiO_2$ from the inert substrate and the resin may then be added. The resulting paint can be filtered through a screen or cloth bag filter to remove any large undesirable particles. The pellets of this invention are most attractive for employment in outside house and masonry paints. In addition, these pellets may be used for pigmenting plastics, especially those employed for abrasive purposes.

Of the pellets formed from coating the above-mentioned substrates, those wherein the substrate is hard titanium dioxide or solicon dioxide are preferable. Of these, titanium dioxide substrates are most preferred due to their greater hiding power, but silicon dioxide is extremely satisfactory if an extender is desired.

Although the present invention has been described with reference to specific details of certain embodiments thereof, it is not intended that such details shall be regarded as limitations except insofar as such limitations are included in the following claims.

What is claimed is:

1. In the vapor phase oxidation of a titanium tetrahalide to form titanium dioxide within a fluidized bed, the improvement which comprises reducing adherence of the titanium dioxide to the bed particles by separately introducing rising gaseous streams of aluminum halide and titanium tetrahalide into the bed, the aluminum halide being introduced in an amount sufficient to produce at least 0.1 percent alumina by weight of the titanium dioxide produced, while providing in the bed particles selected from the group consisting of silica, zirconia, alumina, and titanium dioxide, at least 25 percent by weight of the bed particles containing silicon chemically associated with oxygen.

2. In a process for producing titanium dioxide by the vapor phase reaction of titanium tetrahalide and oxygenating gas within a fluidized bed of particles, the improvement which comprises reducing adherence of the titanium dioxide to the particles by providing bed particles selected from the group consisting of silica, zirconia, alumina, and titanium dioxide, at least 25 percent by weight of the particles containing silicon in chemical association with oxygen, and separately introducing titanium tetrahalide and a rising gaseous stream of aluminum chloride into the bed, the aluminum chloride being introduced in an amount sufficient to produce at least 0.1 percent alumina by weight of the titanium dioxide produced.

3. The process of claim 2 wherein the titanium tetrahalide is titanium tetrachloride.

4. The process of claim 3 wherein the aluminum chloride is aluminum trichloride.

5. In a process for producing titanium dioxide by the vapor phase reaction of titanium tetrachloride and oxygen within a bed of fluidized particles, the improvement which comprises decreasing the adherence of the titanium dioxide to the particles by providing bed particles selected from the group consisting of silica, zirconia, alumina, and titanium dioxide with at least 25 percent by weight of the particles containing silicon chemically associated with oxygen, and separately introducing gaseous stream of titanum tetrachloride and oxygen into the bed, the oxygen stream containing aluminum trichloride in an amount sufficient to produce 0.1 to 10 percent alumina by weight of the titanium dioxide produced.

6. The process of claim 5 wherein the particles containing silicon chemically associated with oxygen are selected from the group consisting of zircon sand, silica sand, and sillimanite.

7. The process of claim 1 wherein the aluminum halide is introduced in an amount sufficient to produce 1.0 to 6.0 percent alumina by weight of the titanium dioxide produced.

References Cited by the Examiner

UNITED STATES PATENTS 2,760,846  8/1956  Richmond et al. _____ 106—300
3,073,712  1/1963  Wigginton et al. _____ 106—300

FOREIGN PATENTS 245,131  12/1959  Australia.

TOBIAS E. LEVOW, *Primary Examiner.*